(12) United States Patent
Matmour et al.

(10) Patent No.: US 9,487,629 B2
(45) Date of Patent: Nov. 8, 2016

(54) METHOD FOR PREPARING A STATISTICAL COPOLYMER BASED ON DIENE MONOMERS AND CYCLIC CARBOSILANE MONOMERS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Rachid Matmour, Clermont-Ferrand (FR); Nicolas Seeboth, Clermont-ferrand (FR); Julien Chatard, Clermont-ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 0 days.

(21) Appl. No.: 14/433,112

(22) PCT Filed: Oct. 1, 2013

(86) PCT No.: PCT/EP2013/070480
§ 371 (c)(1),
(2) Date: Apr. 2, 2015

(87) PCT Pub. No.: WO2014/053509
PCT Pub. Date: Apr. 10, 2014

(65) Prior Publication Data
US 2015/0274896 A1    Oct. 1, 2015

(30) Foreign Application Priority Data

Oct. 2, 2012  (FR) ...................................... 12 59301

(51) Int. Cl.
*C08G 77/60*    (2006.01)
(52) U.S. Cl.
CPC .................................... *C08G 77/60* (2013.01)
(58) Field of Classification Search
CPC .................................................... C08G 77/60
See application file for complete search history.

(56) References Cited

U.S. PATENT DOCUMENTS 5,260,377 A * 11/1993 Weber .................... C08G 77/60
524/788

FOREIGN PATENT DOCUMENTS

SU           304834           12/1972

OTHER PUBLICATIONS

English language translation SU304834, Dec. 1973.*
International Search Report for PCT/EP2013/070480 dated Nov. 4, 2013.
Database WPI, Week 197328, Thomson Scientific, London, GB: An 1973-39167U XP002692055, & SU 304 834 A1 (AV Topchiev Petrochemical) Dec. 25, 1972.
Anonymous: "Polycarbosilanes" Jul. 15, 2002), Encyclopedia of Polymer Science and Technology, Wiley, GB, pp. 426-439, XP007920491, pp. 427, 429.
SH Finkelshtein E. et al: "Polycarbosilanes Based on Silicon—Carbon Cyclic Monomers", Advances in Polymer Science = Fortchritte Der Hochpolymeren-Forschung, Springer, Germany, vol. 235, Oct. 1, 2010, pp. 111-159, XP008160123, ISSN: 0065-3195, DOI: 10.1007/12_2009_39 (Extract 2010-02-250 pp. 119-120.

* cited by examiner

*Primary Examiner* — Margaret Moore
(74) *Attorney, Agent, or Firm* — Dickinson Wright PLLC

(57) ABSTRACT

The present invention relates to a process for the preparation of a random copolymer based on diene monomers and on cyclic carbosilane monomers. This process is characterized in that it comprises a stage of copolymerization, in the presence of an anionic initiator in a reaction medium comprising a polar solvent, of at least one diene monomer and of a cyclic carbosilane monomer corresponding to the Formula I:

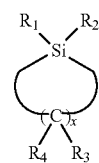

Formula I in which:
$R_1$ and $R_2$, which are identical or different, are each a $C_1$-$C_5$ alkyl, $C_6$-$C_{14}$ aryl or $C_7$-$C_{11}$ alkylaromatic group; $R_3$ and $R_4$, which are identical or different, are each a hydrogen atom or a $C_1$-$C_5$ alkyl, $C_6$-$C_{14}$ aryl or $C_7$-$C_{11}$ alkylaromatic group; and x is an integer with a value ranging from 2 to 5 and is preferably 3.

16 Claims, No Drawings

METHOD FOR PREPARING A STATISTICAL COPOLYMER BASED ON DIENE MONOMERS AND CYCLIC CARBOSILANE MONOMERS

This application is a 371 national phase entry of PCT/EP2013/070480, filed 1 Oct. 2013, which claims benefit of French Patent Application No. 1259301, filed 2 Oct. 2012, the contents of which are incorporated by reference for all purposes.

BACKGROUND

1. Field

The present disclosure relates to random diene copolymers comprising silicon atoms within the main polymer chain. More particularly, the present disclosure relates to the production of these copolymers.

2. Description of Related Art

U.S. Pat. No. 5,357,019 describes the synthesis of crosslinkable polycarbosilanes by reaction of butadiene with a dichlorosilane derivative in the presence of magnesium and iodine in THF. The resulting copolymer alternates the unsaturated units resulting from the diene monomer and the silicon hydride units. In addition, the polymerization times of between 12 h and 24 h are lengthy in order to obtain unsaturated polycarbosilanes having low molecular weights of between 1000 and 20 000 g/mol and high polydispersities.

U.S. Pat. No. 5,171,810 and also the publications of the same authors (Weber et al., Macromolecules, 1988, 21, 1563-1566; Macromolecules, 1990, 23, 1583-1586; Macromolecules, 1990, 23, 1915-1917) for their part relate to the polymerization of unsaturated cyclic carbosilanes by ring opening anionic polymerization, resulting in crosslinkable polycarbosilanes consisting of a perfect alternation of unsaturations and dialkylsilane groups. The resulting homopolymers and copolymers result solely from monomers derived from silacyclopentene, the weight-average molecular weights not exceeding 60 000 g/mol with polydispersities ranging up to 2.6. In addition, this process requires an additional stage of preparation of the silacyclopentene cyclic monomers consisting in reacting butadiene or isoprene with a dichlorosilane derivative in the presence of a metal, such as magnesium or sodium, in a polar solvent, such as THF, diethyl ether or hexamethylphosphoramide (J. Org. Chem., 1968, 33, 1975; J. Organometal. Chem., 1971, 30, 5; J. Organometal. Chem., 1970, 25, 51). The low synthetic yields are between 20% and 40%.

The introduction of unsaturations into polymers of polycarbosilane type has also been carried out during studies on the polymerization by acyclic diene metathesis (ADMET) (Wagener et al., Macromolecules, 1991, 24, 6073-6078). However, the catalysts used require preliminary syntheses and are extremely sensitive to air and to impurities. In addition, their lack of thermostability limits the degree of polymerization for certain monomers. For their part, the various monomers require a synthesis by Grignard route, hydrosilylation or condensation of a silanol and of a chlorosilane.

On the other hand, the groups of M. Gauthier and J. Roovers have described the preparation of hybrid materials based on a polybutadiene shell and a carbosilane dendrimer core by the convergent route (Macromolecules, 2010, 43, 3672; Macromolecules, 1993, 26, 4234). This preparation process consists in synthesizing, in a first step, a carbosilane dendrimer carrying, at the periphery, 32, 64 or 128 reactive chlorosilane functional groups. In a second step, living anionic polybutadienyllithium chains are coupled to these chlorosilane functional groups to generate a hybrid material based on an inorganic carbosilane core and an organopolybutadiene shell.

For its part, the group of M. Moller has presented the synthesis of hybrid materials based on a polybutadiene shell and on a carbosilane dendrimer core by the divergent route (Macromol. Chem. Phys., 1998, 199, 889). The method of preparation consists, in a first step, in synthesizing, by a sequence of stages of hydrosilylation and of reaction with an organomagnesium compound, a polycarbosilane dendrimer carrying unsaturations at the periphery. In a second step, the shell of diene polymers is prepared by living anionic chain growth starting from the lithiated entities generated by reaction of butyllithium with the unsaturations at the periphery. These synthetic strategies have made possible the preparation of polybutadiene stars, for example having 8 or 16 branches.

Patent SU 304 834 describes preparations of copolymers of butadiene and of substituted silacyclobutane in hexane as sole solvent. This patent describes in particular obtaining a copolymer from a specific carbosilane monomer: 1-(p-dimethylaminophenyl)-1-methyl-1-silacyclobutane.

The technical problem which is posed with respect to the state of the art is that of being able to carry out the synthesis of a diene copolymer exhibiting, within the main chain, randomly distributed silicon atoms. More particularly, it is advisable to be able to carry out such a synthesis according to a process which is simple, reproducible, capable of being used on an industrial scale and not exhibiting the disadvantages of the processes of the prior art. In particular, it is advisable to provide a process which does not require the synthesis of the monomers and catalysts, which does not employ long polymerization times and which makes it possible to obtain high molecular weights and low polydispersities.

SUMMARY

The present invention, in various embodiments, responds to this technical problem in that the inventors have developed a novel copolymerization process by simultaneous addition of diene monomers and of specific cyclic carbosilane monomers, making it possible to obtain random copolymers comprising unsaturated units and dialkylcarbosilane units in the main chain of the polymer with the possibility of achieving high molecular weights. The process according to an embodiment of the invention is simple, reproducible and capable of being used on the industrial scale. It makes it possible to synthesize in a controlled manner copolymers exhibiting high molar masses.

A first subject-matter of the invention is thus this copolymerization process.

Another subject-matter of the invention is the random copolymer comprising unsaturated units and dialkylcarbosilane units in the main chain capable of being obtained by this copolymerization process.

DETAILED DESCRIPTION OF SPECIFIC EMBODIMENTS

In the present description and unless expressly indicated otherwise, any interval of values denoted by the expression "between a and b" represents the range of values extending from more than a to less than b (that is to say, limits a and b excluded), where as any interval of values denoted by the expression "from a to b" means the range of values extending from a up to b (that is to say, including the strict limits a and b).

In the continuation of the present description, "unsaturated unit" is understood to mean a unit resulting from a diene monomer and comprising a double bond. Furthermore, "random distribution" conventionally describes a distribution of the constituent units of the copolymer which obeys a random law.

Thus, a first subject-matter of the invention is a process for the synthesis of a random diene copolymer which consists in copolymerizing at least one diene monomer and a cyclic carbosilane monomer of formula I in the presence of an anionic initiator in a reaction medium comprising a polar solvent:

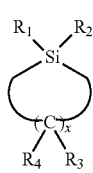

Formula I with:
R$_1$ and R$_2$, which are identical or different, each being a C$_1$-C$_5$ alkyl, C$_6$-C$_{14}$ aryl or C$_7$-C$_{11}$ alkylaromatic group;
R$_3$ and R$_4$, which are identical or different, each being a hydrogen atom or a C$_1$-C$_5$ alkyl, C$_6$-C$_{14}$ aryl or C$_7$-C$_{11}$ alkylaromatic group; and
x being an integer with a value ranging from 2 to 5 and preferably being 3.

In the formula I, when R denotes an alkyl radical, the latter comprises from 1 to 5 carbon atoms, preferably from 1 to 4 carbon atoms and more preferably from 1 to 3 carbon atoms. Mention may be made, as examples, of the methyl, ethyl and propyl radicals.

In the formula I, when R denotes an aryl radical, the latter comprises from 6 to 14 carbon atoms. Mention may be made, as examples, of the phenyl, naphthyl and anthracenyl radicals.

In the formula I, when R denotes an alkylaromatic radical, the latter comprises from 7 to 11 carbon atoms. Mention may be made, as examples, of the benzyl, tolyl and xylyl radicals.

Mention may be made, as cyclic carbosilane of formula I used as monomer according to the process in accordance with the invention, of silacyclobutane, 1,1-dimethyl-1-silacyclobutane, 1,1-diethyl-1-silacyclobutane, 1,1-dipropyl-1-silacyclobutane, 1,1-dibutyl-1-silacyclobutane, 1-methyl-1-phenyl-1-silacyclobutane, 1,1-diphenyl-1-silacyclobutane, 1,1,2-triphenyl-1-silacyclobutane, 1-methyl-1-tolyl-1-silacyclobutane, 1-methyl-1-xylyl-1-silacyclobutane, 1-ethyl-1-phenyl-1-silacyclobutane, 1-ethyl-1-tolyl-1-silacyclobutane, 1-ethyl-1-xylyl-1-silacyclobutane, 1-methyl-1-naphthyl-1-silacyclobutane, silacyclopropane, 1,1-dimethyl-1-silacyclopropane, 1,1-diethyl-1-silacyclopropane, 1,1-dipropyl-1-silacyclopropane, 1,1-dibutyl-1-silacyclopropane, 1-methyl-1-phenyl-1-silacyclopropane, 1,1-diphenyl-1-silacyclopropane, 1,1,2-triphenyl-1-silacyclopropane, 1-methyl-1-tolyl-1-silacyclopropane, 1-methyl-1-xylyl-1-silacyclopropane, 1-ethyl-1-phenyl-1-silacyclopropane, 1-ethyl-1-tolyl-1-silacyclopropane, 1-ethyl-1-xylyl-1-silacyclopropane, 1-methyl-1-naphthyl-1-silacyclopropane, silacycloethane, 1,1-dimethyl-1-silacycloethane, 1,1-diethyl-1-silacycloethane, 1,1-dipropyl-1-silacycloethane, 1,1-dibutyl-1-silacycloethane, 1-methyl-1-phenyl-1-silacycloethane, 1,1-diphenyl-1-silacycloethane, 1,1,2-triphenyl-1-silacycloethane, 1-methyl-1-tolyl-1-silacycloethane, 1-methyl-1-xylyl-1-silacycloethane, 1-ethyl-1-phenyl-1-silacycloethane, 1-ethyl-1-tolyl-1-silacycloethane, 1-ethyl-1-xylyl-1-silacycloethane and their mixtures. The cyclic carbosilane monomer is preferably a silacyclobutane, more particularly 1,1-dimethyl-1-silacyclobutane.

Use may be made, as diene monomer, according to the process in accordance with the invention, of any conjugated diene monomer having from 4 to 12 carbon atoms. 1,3-Butadiene, 2-methyl-1,3-butadiene, 2,3-di(C$_1$ to C$_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene, 2,4-hexadiene, and the like, and also their mixtures, are suitable in particular. The diene monomer is preferably 1,3-butadiene.

According to an alternative form of the process according to the invention, at least one other monomer is copolymerized with the diene monomer and the cyclic carbosilane monomer. This other monomer can be a vinylaromatic compound having from 8 to 20 carbon atoms. Styrene, ortho-, meta- or para-methylstyrene, the "vinyltoluene" commercial mixture, para-(tert-butyl)styrene, methoxystyrenes, vinylmesitylene, divinylbenzene, vinylnaphthalene, and the like, are suitable in particular as vinylaromatic compound. This other monomer is preferably styrene.

Use may be made, as anionic initiator which can be used in the process in accordance with the invention, of any known mono- or polyfunctional initiator. However, an initiator comprising alkali metal is preferably used. Lithium is preferred as alkali metal. Suitable organolithium initiators are in particular those comprising one or more carbon-lithium bonds. Representative compounds are aliphatic organolithium compounds, such as ethyllithium, n-butyllithium (n-BuLi), isobutyllithium, dilithium polymethylenes, such as 1,4-dilithiobutane, and the like. Lithium amides are also initiators which can be used in the context of the invention. Mention may be made of the lithium amides obtained from a cyclic secondary amine, such as pyrrolidine and hexamethyleneimine, which are soluble in a hydrocarbon solvent with or without use of a solvating agent.

According to an embodiment of the process of the invention, the reaction medium comprises an inert polar solvent. Inert solvent is understood to mean, in the context of the invention, a solvent which cannot polymerize with the monomers present. The inert polar solvent can constitute all of the said polymerization solvent. According to a specific embodiment of the invention, the minimum content of polar solvent is at least 10% by volume, with respect to the total volume of polymerization solvent.

Use may be made, as inert polar solvent, for example, of any polar aprotic solvent. Mention may be made, as such, of any nitrogenous compound of tertiary amine type, such as, in particular, triethylamine or tetramethylethylenediamine (TMEDA), or any nitrogenous heterocycle not having acid hydrogen bonded to the nitrogen, such as, in particular, pyridine. Mention may also be made of any ether, such as, in particular, tetrahydrofuran (THF), diethyl ether or dimethyl ether, and the like. The mixtures of these solvents are also suitable in the context of the invention.

According to an alternative form of the process of the invention, the polar solvent constitutes all of the polymerization solvent present in the reaction medium.

According to another alternative form of the process of the invention, the polymerization solvent also comprises an inert nonpolar solvent. According to a specific implementation of this alternative form, the content of nonpolar solvent is greater than 0% and at most 90% by volume, with respect to the total volume of polymerization solvent.

Use may be made, as nonpolar solvent, according to the process in accordance with an embodiment of the invention, of any inert hydrocarbon solvent, which can, for example, be an aliphatic or alicyclic hydrocarbon, such as pentane, hexane, heptane, isooctane, cyclohexane or methylcyclohexane, or an aromatic hydrocarbon, such as benzene, toluene or xylene, and their mixtures.

According to different alternative forms of the process in accordance with the invention, other compounds can be added to the reaction medium. Mention may be made, as example, of tetramethylethylenediamine (or TMEDA), normally used to increase the reactivity of the organolithium compounds.

The polymerization can be carried out continuously or batchwise. The polymerization is carried out at a temperature of at least −100° C., preferably of at least −90° C., indeed even −80° C., and of at most 90° C., indeed even of at most 60° C. and preferably of at most 30° C.

The copolymerization process in accordance with an embodiment of the invention makes it possible to obtain a copolymer comprising unsaturated units and dialkylcarbosilane units, respectively resulting from the diene monomers and from cyclic carbosilane monomers, randomly distributed within the chain. This random diene copolymer also forms the subject-matter of the present invention.

This process makes possible good control of the average molar masses of the copolymers prepared. The latter exhibit a relatively narrow polydispersity index, generally of less than 2. Polydispersity index is understood to mean the weight-average molar mass/number-average molar mass (Mw/Mn) ratio. The average molar masses depend on the polymerization conditions and in particular on the nature of the solvent in accordance with what is explained above.

The copolymer according to an embodiment of the invention exhibits a Tg (glass transition temperature) of between 0° C. and −90° C. and more particularly between −30° C. and −80° C.

The copolymer can exhibit a second Tg greater than the preceding one when a monomer of vinylaromatic type is copolymerized with the diene monomer and the cyclic carbosilane monomer. This is explained by the enriching of a portion of the copolymer in units resulting from this vinylaromatic monomer as the result of a different reactivity. The copolymer nonetheless remains a random copolymer according to the invention insofar as constituent units of the copolymer resulting from the different monomers are distributed in both portions of the copolymer according to a random law.

Furthermore, it is found, unexpectedly, that, when butadiene is copolymerized with a cyclic carbosilane monomer according to the process of the invention, its insertion into the polymer chain takes place predominantly according to an enchainment scheme of 1,4-type, to the detriment of the enchainment of 1,2-(vinyl) type, when the polymerization is carried out in the polymer solvent. In point of fact, it is known that the addition to the polymerization medium of a polar agent has the effect of raising the mean content of the enchainments of 1,2-type. In other words, in the polybutadiene portion of a carbosilane copolymer in accordance with the invention, the content (mol %) of 1,4-butadienyl units is greater than the content (mol %) of 1,2-butadienyl units.

The copolymer of an embodiment of the invention, comprising unsaturated units and dialkylcarbosilane units respectively resulting from diene monomers and from cyclic carbosilane monomers which are randomly distributed within the polymer chain, can be used in similar applications to modified diene polymers.

For example, it is known, for optimization of the interactions between the rubber and the reinforcing filler within a reinforced rubber composition, to modify the nature of the diene polymers. This modification can be carried out either after polymerization, in particular via agents which make it possible to functionalize these polymers along their chain or at the chain end, or by copolymerization with a monomer which introduces units other than those resulting from the diene monomers.

Thus, the specific structure of the copolymer according to an embodiment of the invention makes it possible to envisage its use in the manufacture of various products based on reinforced rubber.

In addition, the random nature of the copolymer makes it possible to adjust the desired content of carbosilane units and thus the content of functional groups which interact with a filler. This property makes it possible to envisage an optimized use of the random diene copolymer according to the invention in the manufacture of these products based on reinforced rubber.

A better understanding of the abovementioned characteristics of the present invention and also of others will be obtained on reading the following description of several implementational examples of the invention, given by way of illustration and without implied limitation.

IMPLEMENTATIONAL EXAMPLES

Measurements Used

The elastomers are characterized, before curing, as indicated below.

Size Exclusion Chromatography

Size exclusion chromatography or SEC is used. SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standards and the polydispersity index (PI=Mw/Mn) can be calculated via a "Moore" calibration.

Preparation of the polymer: There is no specific treatment of the polymer sample before analysis. The latter is simply dissolved, in (tetrahydrofuran+1 vol % of diisopropylamine+1 vol % of triethylamine+1 vol % of distilled water) or in chloroform, at a concentration of approximately 1 g/l. The solution is then filtered through a filter with a porosity of 0.45 μm before injection.

SEC analysis: The apparatus used is a "Waters Alliance" chromatograph. The elution solvent is tetrahydrofuran+1 vol % of diisopropylamine+1 vol % of triethylamine or chloroform, depending on the solvent used for the dissolution of the polymer. The flow rate is 0.7 ml/min, the temperature of the system is 35° C. and the analytical time is 90 min. A set of four Waters columns in series, with commercial names "Styragel HMW7", "Styragel HMW6E" and two "Styragel HT6E", is used.

The volume of the solution of the polymer sample injected is 100 µl. The detector is a "Waters 2410" differential refractometer and the software for making use of the chromatographic data is the "Waters Empower" system.

The calculated average molar masses relate to a calibration curve produced from "PSS ReadyCal Kit" commercial polystyrene standards.

Glass Transition Temperature

The glass transition temperatures Tg of the polymers are measured using a differential calorimeter ("differential scanning calorimeter"). The analysis is carried out according to the requirements of Standard ASTM D3418-08.

Nuclear Magnetic Resonance Spectroscopy

The contents of the various monomer units and their microstructures within the copolymer are determined by an NMR analysis. The spectra are acquired on a Bruker 500 MHz spectrometer equipped with a 5 mm BBIz-grade "broad band" probe. The quantitative $^1$H NMR experiment uses a simple 30° pulse sequence and a repetition time of 3 seconds between each acquisition. The samples are dissolved in carbon disulphide ($CS_2$). 100 µl of deuterated cyclohexane ($C_6D_{12}$) are added for the lock signal.

The $^1$H NMR spectrum makes it possible to quantify the carbosilane units by integration of the signals characteristic of the $CH_3Si$ and $CH_2Si$ protons, which appear at chemical shifts of $\delta=-0.1$ ppm and of between $\delta=0.4$ and 0.5 ppm respectively.

The $^1$H-$^{29}$Si HMQC 2D NMR spectrum makes it possible to determine the nature of the distribution of the units resulting from carbosilane monomers, with respect to the diene or vinylaromatic units, by virtue of the chemical shift values of the silicon nuclei and of the protons in the 2 J vicinity (via 2 bonds).

IMPLEMENTATIONAL EXAMPLES

Example 1

Random Copolymer of 1,1-dimethylsiletane and 1,3-butadiene 1 g of 1,1-dimethylsiletane (1,1-dimethyl-1-silacyclobutane) and 1 g of butadiene, as well as 0.01 milliliter (3 equivalents with respect to the active lithium) of tetramethylethylenediamine (TMEDA), are injected into a 250 milliliter reactor, maintained under a nitrogen pressure of 2 bar, containing 24 milliliters of tetrahydrofuran and 24 milliliters of methylcyclohexane. After neutralization of the impurities in the solution to be polymerized by addition of n-butyllithium, 0.32 milliliter of 0.266 mol/l n-butyllithium is added. The reaction medium then assumes an orange-yellow colouration. The polymerization is carried out at −40° C. After 23 min, the degree of conversion of the monomers reaches 56%. This degree is determined by weighing an extract dried at 110° C. under the reduced pressure of 200 mmHg.

The polymerization is halted by addition of an excess of methanol with respect to the lithium: complete decolouration of the reaction medium is observed. The polymer solution is subjected to an antioxidizing treatment by addition of 0.2 part per hundred parts of elastomers (phr) of 4,4'-methylenebis(2,6-di(tert-butyl)phenol) and of 0.2 part per hundred parts of elastomers (phr) of N-(1,3-dimethylbutyl)-N'-phenyl-p-phenylenediamine and then the polymer is dried by stoving under vacuum at 60° C. for 1 day.

The relative molecular weight Mn of this copolymer, determined by the SEC technique, is 35 700 g/mol and the PI is 1.51.

The microstructure of this copolymer is determined by NMR spectroscopy. The distribution of dialkylcarbosilane and (cis+trans)-1,4-butadiene units is random for 99 mol % of the copolymer. The 1,2-butadiene units represent 1 mol % of the copolymer. The molar content of dialkylcarbosilane units is 72%, that of 1,4-butadiene units is 27% and that of 1,2-butadiene units is 1%.

The glass transition temperature Tg of this copolymer, measured by the DSC technique, is −72° C.

Example 2

Copolymer of 1,1-dimethylsiletane and 1,3-butadiene 5 g of 1,1-dimethylsiletane and 5 g of butadiene, as well as 0.03 milliliter (3 equivalents with respect to the active lithium) of tetramethylethylenediamine (TMEDA), are injected into a 250 milliliter reactor, maintained under a nitrogen pressure of 2 bar, containing 40 milliliters of tetrahydrofuran. After neutralization of the impurities in the solution to be polymerized by addition of n-butyllithium, 2.56 milliliters of 0.390 mol/l n-butyllithium are added. The reaction medium then assumes an orange-yellow colouration. The polymerization is carried out at −80° C.

After 150 min, the degree of conversion of the monomers reaches 54%. This degree is determined by weighing an extract dried at 110° C. under the reduced pressure of 200 mmHg.

The polymerization is halted by addition of an excess of methanol with respect to the lithium: complete decolouration of the reaction medium is observed. The polymer solution is subjected to an antioxidizing treatment by addition of 0.2 part per hundred parts of elastomers (phr) of 4,4'-methylenebis(2,6-di(tert-butyl)phenol) and of 0.2 part per hundred parts of elastomers (phr) of N-(1,3-dimethylbutyl)-N'-phenyl-p-phenylenediamine and then the polymer is dried by stoving under vacuum at 60° C. for 1 day.

The relative molecular weight Mn of this copolymer, determined by the SEC technique, is 10 800 g/mol and the PI is 1.50.

The microstructure of this copolymer is determined by NMR spectroscopy. The molar content of dialkylcarbosilane units is 71%, that of 1,4-butadiene units is 21% and that of 1,2-butadiene units is 4%.

The glass transition temperature Tg of this copolymer, measured by the DSC technique, is −71° C.

Example 3

Random Copolymer of 1,1-dimethylsiletane and 1,3-butadiene 5 g of 1,1-dimethylsiletane and 5 g of butadiene, as well as 0.03 milliliter (3 equivalents with respect to the active lithium) of tetramethylethylenediamine (TMEDA), are injected into a 250 milliliter reactor, maintained under a nitrogen pressure of 2 bar, containing 20 milliliters of tetrahydrofuran and 20 milliliters of methylcyclohexane. After neutralization of the impurities in the solution to be polymerized by addition of n-butyllithium, 0.87 milliliter of 0.267 mol/l n-butyllithium is added. The reaction medium then assumes an orange-yellow colouration. The polymerization is carried out at −40° C.

After 22 min, the degree of conversion of the monomers reaches 63%. This degree is determined by weighing an extract dried at 110° C. under the reduced pressure of 200 mmHg.

The polymerization is halted by addition of an excess of methanol with respect to the lithium: complete decolouration of the reaction medium is observed. The polymer solution is subjected to an antioxidizing treatment by addition of 0.2 part per hundred parts of elastomers (phr) of 4,4'-methylenebis(2,6-di(tert-butyl)phenol) and of 0.2 part per hundred parts of elastomers (phr) of N-(1,3-dimethylbutyl)-N'-phenyl-p-phenylenediamine and then the polymer is dried by stoving under vacuum at 60° C. for 1 day.

The relative molecular weight Mn of this copolymer, determined by the SEC technique, is 62 700 g/mol and the PI is 1.51.

The microstructure of this copolymer is determined by NMR spectroscopy. The distribution of dialkylcarbosilane and (cis+trans)-1,4-butadiene units is random for 99 mol % of the copolymer. The 1,2-butadiene units represent 7 mol % of the copolymer. The molar content of dialkylcarbosilane units is 63%, that of 1,4-butadiene units is 30% and that of 1,2-butadiene units is 7%.

The glass transition temperature Tg of this copolymer, measured by the DSC technique, is −71° C.

Example 4

Terpolymer of 1,1-dimethylsiletane, 1,3-butadiene and styrene 0.66 g of 1,1-dimethylsiletane, 0.66 g of butadiene and 0.66 g of styrene are injected into a 250 milliliter reactor, maintained under a nitrogen pressure of 2 bar, containing 24 milliliters of tetrahydrofuran and 24 milliliters of methylcyclohexane. After neutralization of the impurities in the solution to be polymerized by addition of n-butyllithium, 0.39 milliliter of 0.266 mol/l n-butyllithium is added. The reaction medium then assumes an orange-yellow colouration. The polymerization is carried out at −40° C.

After 2 hours 30 min, the degree of conversion of the monomers reaches 86%. This degree is determined by weighing an extract dried at 110° C. under the reduced pressure of 200 mmHg.

The polymerization is halted by addition of an excess of methanol with respect to the lithium: complete decolouration of the reaction medium is observed. The polymer solution is subjected to an antioxidizing treatment by addition of 0.2 part per hundred parts of elastomers (phr) of 4,4'-methylenebis(2,6-di(tert-butyl)phenol) and of 0.2 part per hundred parts of elastomers (phr) of N-(1,3-dimethylbutyl)-N'-phenyl-p-phenylenediamine and then the polymer is dried by stoving under vacuum at 60° C. for 1 day.

The relative molecular weight Mn of this copolymer, determined by the SEC technique, is 26 300 g/mol and the PI is 1.64.

The microstructure of this copolymer is determined by NMR spectroscopy. The molar content of dialkylcarbosilane units is 25%, that of butadiene units is 11% and that of styrene units is 64%.

The glass transition temperatures Tg of this copolymer, measured by the DSC technique, are −25° C. and 31° C.

The invention claimed is:

1. A process for the preparation of a random copolymer based on diene monomers and on cyclic carbosilane monomers, comprising a stage of copolymerization, in the presence of an anionic initiator in a polymerization solvent comprising an inert polar solvent, of at least one diene monomer and of at least one cyclic carbosilane monomer corresponding to the Formula I:

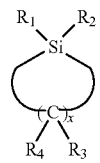

Formula I with:
R1 and R2, which are identical or different, each being a C1-C5 alkyl, C6-C14 aryl or C7-C11 alkylaromatic group;
R3 and R4, which are identical or different, each being a hydrogen atom or a C1-C5 alkyl, C6-C14 aryl or C7-C11 alkylaromatic group; and
x being an integer with a value ranging from 2 to 5.

2. The process for the preparation of a random copolymer based on diene monomers and on cyclic carbosilane monomers according to claim 1, wherein a fraction by volume of inert polar solvent with respect to a total volume of solvent is at least 10%.

3. The process for the preparation of a random copolymer based on diene monomers and on cyclic carbosilane monomers according to claim 1, wherein the polymerization solvent also comprises an inert nonpolar solvent.

4. The process for the preparation of a random copolymer based on diene monomers and on cyclic carbosilane monomers according to claim 1, wherein the anionic initiator comprises an alkali metal.

5. The process for the preparation of a random copolymer based on diene monomers and on cyclic carbosilane monomers according to claim 1, wherein the diene monomer is 1,3-butadiene.

6. The process for the preparation of a random copolymer based on diene monomers and on cyclic carbosilane monomers according to claim 1, wherein at least one other monomer copolymerizes during the copolymerization stage.

7. The process for the preparation of a random copolymer based on diene monomers and on cyclic carbosilane monomers according to claim 6, wherein the other monomer is a vinylaromatic compound.

8. A random copolymer comprising, distributed randomly within a main linear chain of the copolymer, unsaturated units resulting from at least one diene monomer and dialkylcarbosilane units resulting from at least one cyclic carbosilane monomer of Formula I:

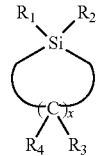

Formula I with:
R1 and R2, which are identical or different, each being a C1-C5 alkyl, C6-C14 aryl or C7-C11 alkylaromatic group;

R3 and R4, which are identical or different, each being a hydrogen atom or a C1-C5 alkyl, C6-C14 aryl or C7-C11 alkylaromatic group; and x being an integer with a value ranging from 2 to 5, the diene monomer being inserted predominantly according to an enchainment of 1,4-type.

9. The random diene copolymer according to claim 8, wherein the diene monomer is 1,3-butadiene.

10. The random diene copolymer according to claim 8, further comprising, in addition to these unsaturated units and these dialkylcarbosilane units, units resulting from at least one other monomer.

11. The random diene copolymer according to claim 10, wherein this other monomer is styrene.

12. A random diene copolymer, prepared according to the process defined in claim 1.

13. The process for the preparation of a random copolymer based on diene monomers and on cyclic carbosilane monomers according to claim 4, wherein the anionic initiator comprises an aliphatic organolithium compound.

14. The process for the preparation of a random copolymer based on diene monomers and on cyclic carbosilane monomers according to claim 7, wherein the vinylaromatic compound is styrene.

15. The process for the preparation of a random copolymer based on diene monomers and on cyclic carbosilane monomers according to claim 1, wherein x has a value of 3.

16. The random diene copolymer according to claim 8, wherein x has a value of 3.

* * * * *